United States Patent [19]
Kepecs

[11] Patent Number: 6,009,411
[45] Date of Patent: Dec. 28, 1999

[54] METHOD AND SYSTEM FOR DISTRIBUTING AND RECONCILING ELECTRONIC PROMOTIONS

[75] Inventor: Jonathan Kepecs, Woodside, Calif.

[73] Assignee: Concept Shopping, Inc., Burlingame, Calif.

[21] Appl. No.: 08/970,526

[22] Filed: Nov. 14, 1997

[51] Int. Cl.$^6$ ................................................. G06F 17/60
[52] U.S. Cl. ................................. 705/14; 705/10; 705/27
[58] Field of Search ................................. 705/14, 42, 27

[56] References Cited

U.S. PATENT DOCUMENTS

| | | | |
|---|---|---|---|
| Re. 34,915 | 4/1995 | Nichtberger et al. | 364/401 |
| 4,554,446 | 11/1985 | Murphy et al. | 235/487 |
| 4,723,212 | 2/1988 | Mindrum et al. | 364/401 |
| 4,817,043 | 3/1989 | Brown | 364/518 |
| 4,825,045 | 4/1989 | Humble | 235/383 |
| 4,882,675 | 11/1989 | Nichtberger et al. | 705/14 |
| 4,910,672 | 3/1990 | Off et al. | 364/405 |
| 4,982,346 | 1/1991 | Girouard et al. | 364/550 |
| 5,039,848 | 8/1991 | Stoken | 235/381 |
| 5,056,019 | 10/1991 | Schultz et al. | 705/14 |
| 5,173,851 | 12/1992 | Off et al. | 364/401 |
| 5,231,568 | 7/1993 | Cohen et al. | 364/401 |
| 5,305,195 | 4/1994 | Murphy | 364/401 |
| 5,373,440 | 12/1994 | Cohen et al. | 364/410 |
| 5,420,606 | 5/1995 | Begum et al. | 345/156 |
| 5,459,306 | 10/1995 | Stein et al. | 235/383 |
| 5,612,868 | 3/1997 | Off et al. | 364/214 |
| 5,687,322 | 11/1997 | Deaton et al. | 705/14 |
| 5,708,782 | 1/1998 | Larson et al. | 705/14 |
| 5,710,886 | 1/1998 | Christensen et al. | 705/14 |
| 5,832,457 | 11/1998 | O'Brien et al. | 705/14 |
| 5,857,175 | 1/1999 | Day et al. | 705/14 |

FOREIGN PATENT DOCUMENTS

| | | | |
|---|---|---|---|
| WO 92/14213 | 8/1992 | WIPO | G06F 15/21 |
| WO 92/20030 | 11/1992 | WIPO | G06F 15/21 |
| WO 94/09440 | 4/1994 | WIPO | G06F 15/16 |
| WO 97/23838 | 7/1997 | WIPO | G06F 17/60 |
| WO 97/30409 | 8/1997 | WIPO | G06F 17/60 |

Primary Examiner—Allen R. MacDonald
Assistant Examiner—Jagdish Patel
Attorney, Agent, or Firm—Townsend and Townsend and Crew LLP

[57] ABSTRACT

A method and system for distributing and redeeming electronic promotions to a consumer through the Internet is provided. An account which is associated with a unique key is maintained for each consumer account. Access is permitted to the consumer account upon presentation of the unique key over the Internet. The consumer is presented discount or other promotional choices of items available in at least one store associated with the key, or a collection of such stores, over the Internet and the selections of the discount or promotional choices made by the consumer over the Internet are recorded. Upon purchase of items at the associated store by the consumer, such data are received, and the selections and purchases are reconciled to record a credit in the customer account. Unlike paper or electronic coupons, no consumer action other than the selection of promotions desired is required for item purchase.

59 Claims, 2 Drawing Sheets

METHOD AND SYSTEM FOR DISTRIBUTING AND RECONCILING ELECTRONIC PROMOTIONS

BACKGROUND OF THE INVENTION

The present invention relates generally to discounting of goods and services to consumers, and, more particularly, to the electronic distribution of promotions, such as discounts and rebates for goods and services, and the subsequent resolution upon the redemption of the promotions by consumers.

Heretofore, consumer discounts have been in the form of physical tokens or coupons by which a consumer can obtain a discount on the price of a good or a service by redeeming the coupon. Typically, paper coupons are physically distributed to consumers. For instance, coupons are often distributed with newspapers, or by blanket mailing to residents of a neighborhood or region. Coupons are sometimes distributed with items so that purchasers are encouraged to continue their purchases of the item, i.e., to encourage brand loyalty.

More recent forms of coupon distribution have attempted to better target the potential purchasers of particular items. For example, coupons are placed on the back of store purchase receipts, such as those at supermarkets, so that the coupons target those who actively shop. The coupons can be changed at the stores to quickly respond to changes in marketing campaigns. Another form of coupon distribution takes advantage of the computerization of sales networks. When a sale of a particular item is entered on a Universal Product Code (UPC) reader at a store, such as a supermarket, a coupon for the same item or family of items may be created for the purchaser to ensure brand loyalty. Alternatively, the coupon may be for a competing band to encourage "brand-switching." Because the UPC reader is typically part of a large computer network, the distribution of the coupons can be changed or terminated very quickly.

Nonetheless, the problems of paper coupons still remain. Besides the distribution of coupons, the expense of the administration for the redemption of the coupons is high. Fraud remains a problem in coupon redemption and the targeting of consumers for particular goods and services can still be improved. Even electronic coupon distribution requires complex actions on the part of the consumer, such as printing a coupon or token, and taking it to a store for redemption. In the ideal case, electronic discounts should only require simple selections by the consumer.

Furthermore, from the producer's and retailer's standpoint, the targeting of consumers remains difficult and expensive. Ideally, a database of all consumers would allow the precisely targeting of advertisements, discounts being a form of advertisement, to individual consumers. The effectiveness of customer targeting would be maximized. To that end, producers and retailers have used emerging technologies to identify consumers and their purchasing interests. Surveys using modern polling techniques have helped create such consumer databases, and computers have been used to correlate buying patterns of customers through store loyalty cards, for example.

However, such consumer identification remains elusive and expensive. Moreover, and perhaps more importantly, such goals of consumer identification are repugnant to notions of individual privacy. With the increased linking of computers by electronic networks, such concerns are likely to increase. Besides the individual resistance to divulging personal information, legal restraints on the use and gathering of personal information are possible, if not likely.

The present invention provides for a system and method which addresses these privacy concerns in a flexible way, while providing for the effective targeting of consumers. The most appropriate discounts or other promotions are directed toward the individual consumer, yet the anonymity of the consumer is preserved. The present invention eliminates the paper coupon or its electronic counterpart, and is highly resistant to fraud. No paper coupons are handled by the consumer, the merchant, the manufacturer of the goods, or provider of the service.

In addition to targeting consumers individually by their purchasing habits, the present invention also permits the consumer to view their total buying history. This is not a feature currently available at the level of retail sales. While credit card companies today track purchases at the store level, purchases at the level of individual items are not tracked. The ability of a consumer to track his or her total consumption history is a unique feature of the current invention.

The present invention also permits the aggregation of several kinds of discounts. For example, a retailer loyalty program may offer a discount on an item, and a manufacturer may offer a discount on the same or a different item. The present invention permits a unified display and reconciliation of both discounts; in the former case by adding two discounts on the same item, and in the latter case, by displaying both discounts in the same account.

SUMMARY OF THE INVENTION

To reach these seemingly contradictory goals, the present invention provides for a method and system for distributing and redeeming electronic promotions to a consumer through a communications network, such as the Internet. An account is maintained for each consumer and a unique key is associated with each consumer account. This account may be established by a registration process, such as is used in so-called "loyalty card" programs many retailers currently have in place. Access is permitted to the consumer account upon presentation of the unique key over the communications network. The consumer is presented discount choices of items available in at least one store associated with the unique key, or a collection of such stores, over the network and the selections of the discount choices made by the consumer over the communications network are recorded. Upon purchase of items at the associated store by the consumer, such data are received, and the selections and purchases are reconciled to record a credit in the consumer account.

In one embodiment of the present invention, no direct consumer identification is maintained in the consumer account to preserve the anonymity of the consumer. For example, only the loyalty card identifier need be managed according to the present invention; the identity of the consumer is not needed. The purchasing history of the consumer at the store where the promotion is redeemed for items (which need not be limited to the item(s) being promoted) is maintained in a database, and the consumer may access this history (in one embodiment of the invention). This history can then be used not only to help the consumer in personal finance management efforts, but also to help the consumer identify trends in his buying habits which may benefit from modification or reinforcement.

DETAILED DESCRIPTION OF THE SPECIFIC EMBODIMENTS

The channels of distribution of, and payment for, good s in a modern society are complex. Broadly stated, there is the producer which manufactures the goods, the retailer which sells the goods, and the consumer who purchases the goods. There is often a financial institution which supplies credit, for example, through a credit card, or which administers some other non-cash payment system, for example, through a debit card or a so-called smart card, for the consumer to purchase the goods. To compete in the marketplace, the producer and the retailer of goods employ advertising, including discounts, e.g., coupons, to encourage consumers to purchase their goods.

Increasingly, retail stores, especially chains of retail stores, are offering loyalty cards which reward shoppers for frequenting the store(s) covered by the loyalty card. Stores generally obtain customer information (such as name and mailing address) and assign the customer a unique (to the store or chain) number for identification purposes. When the loyalty card is used, advertised promotions are given to the consumer in the form of discounts or points, which may be redeemed directly at the point of sale as a credit against a purchase.

In such complex circumstances, the present invention takes advantage of another development in modern society, that of the Internet, and in particular, the Worldwide Web. With the development of the personal computer, the emergence of the so-called network computer, and computer/TV devices designed specifically to operate over the Internet, such as WebTV or NetPC units, more and more people are using the Internet to receive and transmit information. The present invention uses the Internet by which the consumer receives advertising and discount information, and selects the desired promoted products. In certain cases, the consumer also receives information on the credits obtained by his or her purchase of discounted items. Conversely, the producer and retailer obtain useful consumer information to precisely target their advertising and promotional offers. This is all achieved without requiring the particular identities of consumers to be revealed. Privacy is thus preserved to a large extent.

In general terms and in accordance with the present invention, consumers communicate with an Electronics Discount Administrator (DAP) over the Internet. Each consumer identifies him or herself to the DAP by a unique KEY, which provides an identification of the consumer to the DAP, and at the same time, a barrier for the consumer from the DAP. The DAP makes the consumer aware of discounted and promotional items, which have been made available by discounting entities (the discounters), which offer the discounts to the consumer. A discounter may be one or more direct producers, such as cereal makers; repackagers, such as stores offering products manufactured by producers under the stores' names; or stores which offer many discounted products which the stores resell. The discounts are indicated by amount, locations where the discounted items may be purchased, and time of expiration of the discounts. The consumer makes his or her selections electronically, and the selections are recorded by the DAP.

To obtain the discounts, the consumer visits an associated location, e.g., a store, and purchases the discounted items. To identify himself or herself to the store, the consumer uses the unique Key. The store sends a record of the purchases with the consumer's identifying Key to the DAP. The DAP reconciles the consumer's selections with the purchases at the store. The consumer may receive the discount at the time of purchase, or receive a credit in a designated financial account, e.g., the consumer's credit card account.

It should be noted that there is an exchange of benefits between the consumer and the discounter. In return for information containing the consumer's purchasing interests, the discounter gives the consumer a discount or some other promotional benefit. Hence it is important that the consumer make the selection of discounted items. Without the selection, the discounter of the product is simply posting lower prices to the general public over the Internet. Additionally, while this specification mentions the distribution, discounting and sale of goods, it should be understood that the present invention is equally applicable to discounted services as well.

The Electronic System Organization

The present invention operates over an organization of computers linked over networks. It should be understood that while a single computer might be described, the computer might be one or more computers which are tightly coupled (e.g., connected over a backplane), or more loosely coupled (e.g., connected by a network).

Figure 1:
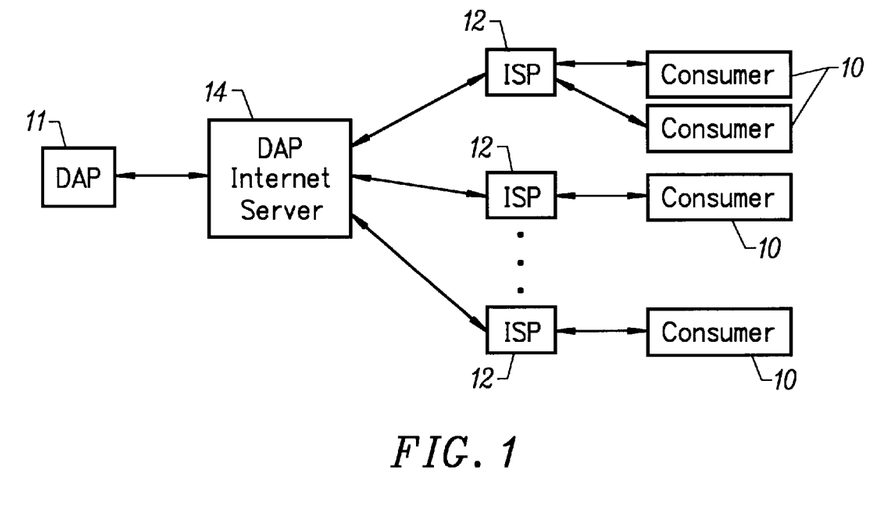
FIG. 1 is a block diagram of an Internet computer network link between consumers and the Discount Administration Process (DAP), according to the present invention.

FIG. 1 illustrates the general interconnection of consumers to the Discount Administration Process (DAP) by which the consumers receive advertising and discount information and make their selection of the "electronic discounts." The consumers use their computers 10 for connection to the computer 11 of the DAP through the Internet. The consumer computers 10 may be standard personal computers, the emerging so-called network computers, computer/TV devices designed specifically to operate over the Internet, such as WebTV or NetPC devices, or other data entry systems which permit two-way communication over the Internet. The consumer computers 10 access the Internet through a computer server 12 of an Internet service provider (ISP). The ISP server 12 is connected to the Internet, a network of computers, represented by an Internet computer 13. The DAP computer 11 is connected to the Internet through a DAP Internet computer server 14.

Figure 2:
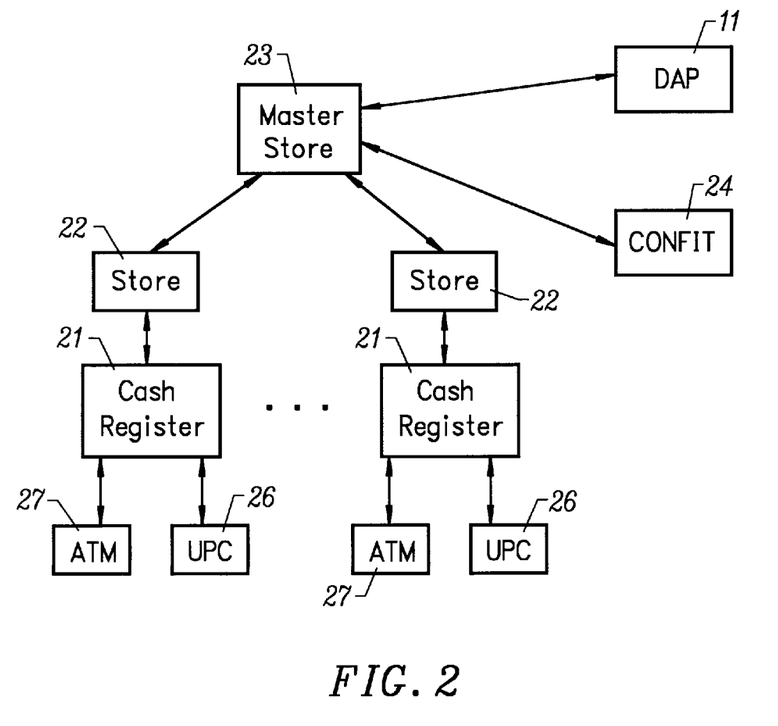
FIG. 2 is a block diagram of a representative point-of-sale computer network system, as found in a typical modern retail operation, and its connection to the DAP.

The DAP computer 11 is also connected to the computers of the seller of the discounted goods. FIG. 2 is illustrative of the general organization of the point-of-sale operation, i.e., a large store chain, for goods (and services). The store, e.g., a supermarket, typically operates with electronic cash registers 21, essentially computers which record each item sold, calculate the sales totals, prints the receipt, and so forth. Each cash register 21 is often connected to a Universal Product Code (UPC) scanner 26 and/or an Automated Teller Machine (ATM) reader 27. The UPC scanner 26 identifies bar codes on the products to the cash register 21. The ATM reader 27 reads the magnetically encoded account number of a credit/debit/smart card which has been issued by some financial institution, such as a bank, or a store-issued loyalty card, belonging to a consumer. Some cards may also encode their identification number as a bar code which is read by the UPC scanner. The ATM reader 27 also typically accepts typed-in, or otherwise entered, private information, such as a personal information number (PIN), to securely identify the card holder.

In some larger stores, the cash registers 21 are connected to a store computer 22, which maintains the centralized inventory, pricing and discount information of the store. In turn, the store computer 22 is connected via a network to a master store computer 23. The master store computer feeds pricing information to many store computers 22. Of course, there can be multiple levels for store computers 22 depending upon the size of the retail operation. Naturally, nationwide store chains are likely to have many more computers and computer interconnections.

Outside of the retail network, the master store computer 23 is connected to the computers 24 of financial institutions (FIT). The FIT computers 24 verify and process the financial transactions involving credit, debit and smart cards, including those at the store register 21. Besides the connections to the FIT computers 24, the master store computer 23 is connected to the DAP computer 11. This connection permits the DAP computer 11 to reconcile the selections made by the consumer with the purchases at the store.

It should be noted that the computer network which interconnects the cash registers 21, UPC readers 22, ATMs 23, store and master store computers 22 and 23, and the FIT computers 24 belong a private network, i.e., not the Internet. Such networks are typically in the form of WANs (Wide Area Networks) of varying degrees of complexity. The DAP computer 11 is connected to this network to make the interconnections described above.

Figure 3:
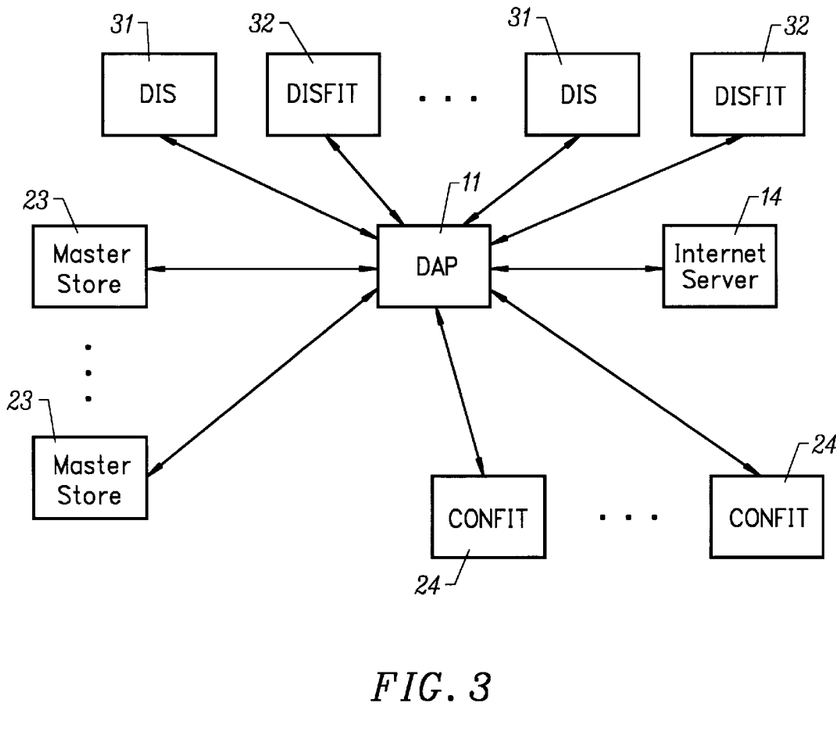
FIG. 3 is a block diagram of a computer network connection between the discounters and the DAP, according to the present invention.

FIG. 3 illustrates the general network interconnection of the DAP computer 11, not only with the DAP Internet server 14 and master store computer 23, but also with the computer 31 of a discounter (DIS) and a computer 32 of the discounter's financial institution (DISFIT). The connection to the DIS computer 31 allows the DAP computer 11 to receive discount information, detailed below, from the discounter. The DAP computer 11 communicates with the DISFIT computer 32 so that the discounter's account is debited for goods purchased by the consumers under the discounter's discount. The DAP computer 11 may also be connected to the computer 24 of the consumer's financial institution (CONFIT). This connection allows credit obtained by the purchase of discounted goods to be placed into the consumer's account at the consumer's financial institution in an embodiment of the present invention wherein the discount is not taken at a store register 21.

As in the case of the store WAN above, the computer network for the discounter and its financial institution(s) is another private network, typically a WAN. The DAP computer 11 is connected to this network and other private networks belonging to the financial institutions of the consumers.

Operations of the System
The Discount Administration Process Computer

The DAP computer 11 maintains a Key Database of the consumers' accounts. As explained above, a unique Key identifies the account of each consumer, but not necessarily the actual identity of the consumer. Each consumer may select his own Key, as long as the Key does not conflict with other Keys, or the Key may simply be assigned to a consumer.

Keys may be distributed by financial institutions, such as credit/debit/smart card companies, or by a third party, such as the operator of the DAP. A Key might also issued as a part of a retailer's loyalty card program. The stores accepting a particular Key are associated with the Key. For example, when the consumer specifies a unique identification (ID) bound to a particular loyalty program, retailer or chain, the stores associated with the Key are clearly defined. Of course, only certain identified stores within a chain may offer a particular promotion.

There can be different levels of identification in the Key Database. One level is the secure registration level. At this level, the Key Database, which is stored on the DAP computer 11, contains a consumer's KEY and one or more credit/debit/smart card account numbers (FIDs) issued by a financial or retail institution to the consumer. The Key Database appears as (note that there is a database for each set of KEY's obtained by a separate registration process. Thus, if two different store chains with separate loyalty programs are in the database, the same consumer may be represented by two different KEY's, and the identity of the chain is implicit in which database is accessed):

$<KEY_0, FID_0, FID_1, \ldots FID_K>$
$<KEY_1, FID_0, FID_1, \ldots FID_K>$
$<KEY_2, FID_0, FID_1, \ldots FID_K>$
. . .
$<KEY_m, FID_0, FID_1, \ldots FID_K>$ The Key Database may contain alternatively or concurrently some other personal identification, such as a Social Security number, a driver license number, passport number, or even biometric information, such as a fingerprint, of the consumer.

A lower level of identification is protected registration. The Key Database contains the KEY and a lower level of identification of each consumer. An example is simply the KEY and the address of the consumer. It should be noted that it is sufficient in this method to simply identify the household belonging to a Key, for example, by mailing a Key-containing card to the occupant of a given address. In this way, while a consumer remains anonymous, the consumer will have significant difficulty in obtaining a second, unrelated account. Should an attempt be made by requesting another Key at the same address, the first Key can be invalidated. Should an attempt be made by requesting another Key at a different address, the existence of a Key already assigned to that different address can generate a request for the requester to either indicate a change of address (resulting in a different Key being subsequently issued to the previous address), or an invalidation of the original Key. This binding of Key to address thus allows the consumer to remain anonymous when accessing their account over the Internet, and allows the discounting computational system to maintain a consistent history of buying habits for a household, without compromising the individual's privacy. Note that the address might also be an e-mail address.

Finally, the lowest level of identification is simply the KEY with no other identification data. The consumer is completely anonymous. This method may be used by the DAP computer 11 even if the KEY has non-anonymous bindings elsewhere (for example, if the KEY is associated with a store's loyalty card). Thus, the consumer can still be anonymous to the DAP, even if the store is aware of the consumer's identity or just his address.

These different levels of identification imply different mechanisms and timing for reconciling the discounts of goods purchased by the consumer. These mechanisms are discussed below. An important aspect of the invention is that disjoint sets of KEYs may refer to the same consumer, yet still be reconciled to belong to one consumer. For example, a consumer may belong to two different loyalty cards, each with their own KEY. The DAP may thus have:

<KEY1, store loyalty ID1>
<KEY2, store loyalty ID2>
. . .

One way to associate KEY1 and KEY2 to the same consumer is simply to allow the consumer to specify both Keys. This can allow the program running on the consumer's computer 10 to automatically correlate both accounts to present the consumer with a total summary of purchasing history, even though the DAP computer 11 is unaware of the correlation. It is also possible for the consumer to provide KEY1 and KEY2 (and KEY3, KEY4, etc.) to the DAP computer 11 so that the DAP computer can make the association. This same technique can be used to correlate addresses if less secure Key binding is used.

Duplication of discounts is sometimes a problem. Within a single Key space (e.g., one bound to a single loyalty or credit card), duplication can be eliminated by simply refusing to issue more than one, or only a set number of, promotion(s) for a given item within a given time period. The same can be done across multiple correlated Key spaces. If Key spaces are un-correlated, then duplication cannot be categorically disallowed. However, because Key spaces are typically shared by non-conflicting retailers, and because the consumer can gain increasing benefits by repeatedly using the same Key space, duplication of promotions across un-correlated Key spaces is not a severe problem.

For the consumer's convenience, the DAP may issue an identification card to each consumer with a magnetic or bar code for his Key. The card allows the consumer to quickly identify his Key and account at a store with a UPC scanner 26 or ATM reader 27. The card might also show the Key so that the consumer can type in his Key. Alternatively, for additional security, the consumer's identification card may carry an encrypted or hidden identification code (such as a PIN) before the consumer's Key is validated after being read at a store, for example. Alternatively, the DAP may simply rely on Keys already obtained by the store or credit card agency.

The Key Database is also maintained on the DAP Internet server 14. When the database on the DAP computer 11 is updated, so is the DAP Internet server 14. Whenever the consumer uses his or her computer 10 to access the DAP Internet server 14, he must specify his KEY. This enables the consumer to access information unique to himself. The DAP Internet server 14 presents the discounts available to the consumer over his computer 10. In addition to a menu search of available discounted products, a "stream of consciousness" search is also available. For a example, a consumer's interests may be queried. The DAP Internet server 14 then suggests that the consumer investigate products of a certain type.

Note that there is no particular security placed on the Key itself. The knowledge of the Key does not compromise the security of the system, since the consumer's identity is unavailable for harassment (for example, by telemarketing firms) and selection of discounts by others using the Key confers no benefit on the person other than the true keyholder.

Presentation of Discounts on the DAP Internet Server

To present the discounts and other promotions to the consumers, the DAP Internet Server 14 maintains a database of products categorized by type, price, stores in which locations sell the product, etc. Each discounter makes its discounts available to the consumer through the DAP computer 11. The discounter "advertises" its products in this manner over the Internet.

A record from this Product Database appears as:
<PRODUCT_NAME, CATEGORY$_0$, CATEGORY$_1$, . . . CATEGORY$_N$>
where PRODUCT_NAME is the identification of the particular product (or service), and CATEGORY$_0$, CATEGORY$_1$, . . . CATEGORY$_N$ are the different fields by which the product may be categorized. The category information is also termed the Product Tag. The DAP Internet server 14 has this database information so that the consumer can browse through product and discount information, as described above.

In addition, the discounter supplies the DAP with other information, including the discounter's name and other information which identifies the discounter (DISNAME), the discounter's billing information so that a discount credited to a consumer is debited, either automatically or by invoice, from the discounter, discount information (Discount Tag), the product UPC number (UPC_NUMBER), and other related information. Discount Tag contains consumer targeting information, i.e., what kinds of consumers should receive what discounts. A Discount Tag Database record appears as:
<DISNAME, UPC_NUMBER, CRITERION0, CRITERION1, CRITERION2, . . . CRITERIONJ, DISCOUNT, DISCOUNT_FLAGS, DISCOUNT_TIMEOUT>
where CRITERION0, CRITERION1, CRITERION2, . . . CRITERIONJ are different fields containing consumer targeting information. An example of a criterion is "customers who apparently live in postal ZIP code Z." The CRITERION fields can be matched by the purchasing patterns of consumers. As described below, these purchasing patterns may be derived from the historical data of each consumer's account, including selections made and redeemed, and just selections made, though without the actual identification of the consumer. To help the discounter make effective use of the consumer information, the DAP computer 11 has a program which uses the criteria and discount information to target consumers with discounts in a simple yet anonymous manner. The program uses GUIs (Graphical User Interface) at the discounters' computers 31, or computers used on behalf of the discounters, to allow each discounter to easily match customer, criteria, and discount information. Note that from the consumer information, consumer targeting may be as narrow as possible, i.e., individuals, or very broad, e.g., large aggregates of consumers in particular regions, etc.

It should be noted that though the word, discount, is used, the promotions might be in other forms of purchase incentives. For example, based upon a consumer's purchasing history, the promotion might be a special price for an item or items to that particular consumer. Correlations between items might be found such that promotions can be created for items which have no obvious relationship to items purchased by the consumer. Caribbean vacations might be offered for large purchases of premium dog food, as a purely hypothetical example.

The DISCOUNT_FLAGS include one or more fields which indicate special discount processing information—for example, 3 items must be purchased for the discount to apply. TIME_OUT are data fields containing information for the management of discount timing, including the period of validity of a discount, and the expiration of the eligibility of a consumer for discounts.

The discounter also supplies a Product Distribution Database to the DAP. This database contains the information on the particular retailers which stock each of discounted items. The database informs the consumer who is eligible for a discount based upon criteria selected by a discounter where an item is available for purchase and the discount. Optionally, the database may allow the discounter to restrict discounts to specific stores, or to allow discounts only at stores selected by consumer. The database has the network location of each store for subsequent download/upload of store information. A record of this Product Distribution Database, appears as:

<STORE_NAME, STORE_LOCATION, STORE_NETWORK_ADDRESS, $ITEM_0, ITEM_1, ITEM_2, \ldots ITEM_J$> where STORE_NAME is the field of the retailer identification, STORE_LOCATION is the field of the retailer's particular store, STORE_NETWORK_ADDRESS is the field of the electronic address of the store, and $ITEM_0$, $ITEM_1$, $ITEM_2$, ... $ITEM_J$ are the fields identifying the particular discounted items. This database is maintained in both the DAP computer 11 and the DAP Internet server 14.

Selection of Discounts by the Consumer

Through his or her computer 10, the consumer browses through the discounts or other promotions available to him or her at the DAP Internet server 14. A Web site provides a GUI for the consumer's computer 10 to easily access his or her account on the DAP computer 11. The Web site might be operated by the DAP computer 11 through the server 14, or the server 14 itself might operate the Web site and interact with the DAP computer 11 as needed. Alternatively, if the consumer's Key is created through a particular company's loyalty card program, the consumer may be directed to a Web site operated by the company.

The consumer selects the desired discounts, and if required, at which stores. Additional information about the products, such as marketing information, may be displayed. For instance, from previous purchasing information about the consumer, or, more precisely, the consumer account, the DAP computer 11 can make a correspondence with the consumer's Key with one or more stores where the consumer is likely to make his or her purchases and present promotions at those stores to the consumer. The selected discounts and their total value are displayed to the consumer and a per-account list of selected discounts, any restrictions on these discounts, when each discount was selected, and the expiration date of the discount, along with the discount value, is sent to the DAP Computer 11.

The consumer's selections are recorded by the DAP computer 11 through the DAP Internet server 14. To prevent tampering of the consumer's selections, the DAP computer 11 also has an optional security lock feature. Once the security lock is set, it is difficult, or impossible, for a malefactor to deprive a consumer of his selected discounts by subsequently deleting or changing them. This lock may be set by the consumer after his selections are made. The lock may also be set by the DAP if a pattern of misuse is detected, by the receipt of consumer complaints, for example.

To validate the purchase of the selected discounted products by the consumer, information is exchanged between the master store computer 23 and the DAP computer 11, over the network illustrated in FIG. 2. The information helps the store administer the sale of the discounted products to the customer who selected the products.

An additional feature of the consumer's account is that items which are purchased but not promoted, may also be sent to the DAP computer 11 to maintain a complete shopping "microhistory" for the consumer. This microhistory can subsequently be used to create a profile on a (typically otherwise anonymous) consumer's purchasing habits for promotional targeting, as well as to provide the consumer with an aid for personal financial accounting, as discussed in greater detail below.

Customer Purchase of Discounted Items at Store

To realize his selected discounts, the consumer identifies his Key during the purchase of items at a store. Each store maintains a record of the consumers' transaction, such as:

<CUSTOMER_NO., <$UPC_0$, $PRICE_0$, $QUANTITY_0$>, <$UPC_1$, $PRICE_1$, $QUANTITY_1$>, ... <$UPC_K$, $PRICE_K$, $QUANTITY_K$>, <$DISCOUNT\_TYPE_0$, $VALUE_0$>, <$DISCOUNT\_TYPE_1$, $VALUE_1$>, . . . <$DISCOUNT\_TYPE_K$, $VALUE_K$>>

This transaction record is part of a Customer Record database. The store registers 21, under operation of software from the DAP, accepts Key information from the consumer and appends the Key and time of transaction, i.e., <KEY, TIME> to the transaction record. The Customer Record database is stored in the store master computer 23.

The consumer may provide his Key with a card containing the Key in the form of magnetically-encoded data or bar code data, which is simply scanned in. The Key may be in a separate card, or in a credit/debit/smart card which also includes the Key data. A retailer's loyalty card can include the Key data, which might simply be the store's loyalty card ID. The Key can also be provided by the consumer by simply entering the Key at an ATM reader 27 (using a template, such as those on push-button telephones) or letting the store clerk enter the Key at the register 21. More exotic forms include biometric identification. In any case, the DAP software at the register 21, and possibly at the master store computer 23, records the Key and the transaction data.

Alternatively, the consumer need not specify his Key. With a list of financial institutions which are tied to the DAP consumer accounts, the store can determine the consumer's Key. For example, upon the reading of his credit/debit/smart card, say, a VISA (a registered trademark of VISA International, Inc.) credit card, the store's register 21 automatically ties the transaction to the consumer's Key. Such accounts may be "read-only," or, more precisely, "deposit-only," financial institution accounts, which are credited with accepted promotions. The credits in these accounts are subsequently transferred into the consumer's liquid accounts upon validation of the identity of the cardholder.

Note that the Key may be securely associated with a customer's financial institution account (through the Key Database) without the DAP or the store knowing the financial institution account. Theft of a Key is not serious because someone in possession of the Key can only select discounts or other promotions which accrue to the actual Key holder. No significantly bad results can occur since the discounted products must still be legitimately purchased.

At the time of purchase, the store register 21 may print an itemized list of the discounts which the DAP will credit. The data describing discounted items purchased and optionally, all items, must be reconciled with the DAP. Note that full reconciliation may require that all discounts (e.g., paper coupons) be also included in this data, so that two or more discounts on the same item, which are not permitted by the retailer or the manufacturer for aggregation, are not added.

Thus, there is a flow of data from the DAP computer 11 to the store register 21 (generally via the store computer 23) which describes discounts available to a given account (generally accessed via the account KEY), and a reverse flow of data from the store register 21 to the DAP computer 11 to describe the items actually purchased. The latter flow is needed to ensure that discounts which have been used cannot be reused unless reuse of discounts is specifically allowed.

The flow of data to the store register 21 from the DAP computer 11 must take place after the consumer selects applicable discounts and before the consumer arrives at the store. The DAP computer 11 may infer, based on likely location of the store where the discounts will be applied, or most likely applied, (either the store is expressly noted, or the consumer's purchasing history may indicate likely store selection), the time interval the DAP computer 11 has before the store computer 23 must be informed to ensure that the consumer's discounts are available, etc. It is also possible that the DAP computer 11 is consulted directly for each consumer action, thus eliminating the need for the DAP to pre-load the store computer 23 with data. Similarly, there may be a time delay before the DAP computer 11 is informed of the actual purchases (since it may be reasonably assumed that it may take some time for the consumer to go to a different store and attempt to re-use an accepted discount, and the store computer 23 could track attempts by the consumer to re-use an accepted discount at the same store). Alternatively, the DAP computer 11 may be informed immediately upon consumer purchase.

In any of the data flow scenarios where the DAP computer 11 and the store computer 23 do not interact immediately and information is saved for a period of time before the account is reconciled, we refer to this stored information as cached data. Caching data can reduce latency (so that the consumer need not wait for a remote transaction between the store and DAP computers take place), but introduces complexity since cached data can become invalid in many ways. For example, if several stores receive cached data about a given account, once the customer using the account makes a purchase, there is only a limited amount of acceptable delay before the cached data must be invalidated. This can be accomplished by having a computer act upon an invalidating event (the DAP computer 11 may do this if, say, a discount is canceled or added; the store computer 23 does this when discounts are accepted) and informing its peer. Alternatively, the computer acting upon an invalidating event may first query its peer to see if any other invalidating events have happened. If not, the transaction can be completed and the peer computer is put on notice that subsequent transactions should not be processed immediately. Otherwise, the transaction must wait until the invalidating event has been completely processed and any necessary cached data are reloaded.

Reconciliation of Consumer Accounts

To reconcile each consumer account, the recorded selections and time of selection information on the DAP Internet server 14 are validated against the purchase proofs (time, products, KEY, store ID) recorded at the store. From the store, the DAP computer 11 receives the purchase proof records, the Key, a financial institution or read-only financial institution account number, the identity and quantity of the discounted items purchased, other applied discounts, and the time of purchase, for each consumer account.

A Discount List database is created for a list of discounts due to the customer. A record of this database appears as:

<KEY, STORE, UPC0, OTHER_DISCOUNTS0, UPC1, OTHER_DISCOUNTS1, . . . >

From the discount information supplied by each discounter and stored on the DAP computer 11, the computer 11 compiles a Reconciled Discount List database, a final list of discounts created by resolving conflicting discounts. For example, if a paper or electronic coupon had also been presented by the consumer for a discount, this discount may be disallowed. Reconciliation with the consumer discount selections is also made to obtain the correct discounts due.

In making the reconciliation between purchases and consumer selections, some discounters may not care if the purchase was made before the consumer's selection, instead of selection first.

A record of the Reconciled Discount List database appears as:

<KEY, STORE, DISCOUNT0, UPC0, DISCOUNT1, UPC1 . . . >

From the Reconciled Discount List database, the total discount due for each Key is computed and a list of discounts payable by the discounter is determined. The DAP computer 11 debits the discounter's financial account computer 32 accordingly. Note that DISCOUNT contains information indicating the identity of the discounter. Conversely, if the DAP computer 11 has the database for mapping each KEY to a consumer's financial institution account, the DAP computer 11 credits the consumer's financial institution account. Otherwise, the discount amount is simply deducted from the consumer's bill at the point of sale. If the consumer's financial institution has the necessary information to make the mapping between the Key and a financial institution account, the necessary information is sent directly to the financial institution computer 24. All of these transactions are performed electronically where possible.

A full history of all data is retained for auditing purposes. Final auditing steps, such as the validation of store inventory to cover the store claims for credit of the sale of discounted items and certification by an external accounting agency, complete these steps of the operations.

The Reconciled Discount List database is also stored on the DAP Internet server 14 so that each customer, using his or her KEY, can browse his discount file. This information also facilitates the consumer's selections since the database provides an indication of the consumer's interests by the previous purchases. For additional convenience and usefulness to the consumer, the consumer's information is available in industry standard format. This allows the consumer to use third party software, such as personal finance management of which Quicken, (a registered trademark of Intuit, Inc. of Mountain View, Calif.) is merely an example, to maximize the use of the consumer's information, for his or her benefit.

The purchasing history can be used to infer consumer marketing information without the intrusion of additional personal information disclosure or the burden of consumer surveys. The aggregation of the purchasing histories of the consumers can be used to find trends or patterns in consumer purchases as broadly or narrowly as desired. Nonetheless, despite this use of consumer information, the privacy of the particular consumer is protected as described above.

It should be observed that the present invention has many security features and options:

a. If the consumer's Key is associated with a financial institution account, Key secrecy is unnecessary since security depends only on the security of the financial institution account.

b. Stores cannot cheat (other than to falsely increase processing charges) by issuing false proofs of purchase to a Key since the benefit goes only to the true holder of the financial institution account.

c. If, instead of the DAP, a financial institution issues the Key to the consumer, only the Key is required to be shared with the DAP. Neither the store nor the DAP needs access to the consumer's financial institution account associated with the Key.

d. If a financial institution creates a special deposit-only account, which access is shared with the DAP and/or the store, only the financial institution may transfer money from this account to a main consumer account upon a discount validation by the DAP.

e. By limiting or prohibiting modifications to discounts selected by the consumer, a computer "hacker" with knowledge of the consumer's Key cannot frustrate the consumer by tampering with consumer selections.

f. By limiting the number of selected products, the time period during which the selected discounts remain valid, or by using simple challenges, consumers cannot abuse the system by simply selecting all discounts, or even having discounts selected by an agent program automatically, to avoid the conscious selection of discounts. If such were possible, consumers could obtain the benefits of discounts without returning to the discounters the benefit of their advertising.

While the foregoing is a complete description of the embodiments of the invention, it should be evident that various modifications, alternatives and equivalents may be made and used. Accordingly, the above description should not be taken as limiting the scope of the invention which is defined by the metes and bounds of the appended claims.

What is claimed is:

1. A system for distributing and redeeming electronic promotions to a plurality of consumers comprising:

a first communications network interconnected to a plurality of first computers interfacing with said plurality of consumers;

at least one second computer connected to said first communications network, said second computer maintaining an account for each consumer, said account including a database, each consumer account accessible upon presentation of a unique key over said first communications network, said accessed account showing promotion choices of items available at least one store associated with said key, said second computer recording data of selections of said promotion choices made by said consumer over said first communications network; and a second communications network interconnecting said second computer and at least one computer at said associated store so that said second computer and said store computer can exchange recorded selection data of promotion choices and purchase data of items at said associated store over said second communications network to reconcile said selections and purchases to credit said consumer.

2. The system of claim 1 wherein said second computer reconciles said selections and purchases to record a credit in said consumer account.

3. The system of claim 1 wherein said store computer reconciles said selections and purchases to directly reduce a total price of selected and purchased items.

4. The system of claim 1 wherein said second computer maintains only limited direct identification of each consumer in said account database.

5. The system of claim 4 wherein said consumer account database excludes identification of said consumer by name.

6. The system of claim 5 wherein a record of said consumer account database has only said key, at least one financial institution account number, and purchasing history for each consumer.

7. The system of claim 6 wherein said financial institution account number comprises a credit card number.

8. The system of claim 6 wherein said financial institution account number comprises a debit card number.

9. The system of claim 6 wherein said financial institution account number comprises a smart card number.

10. The system of claim 6 further comprising a third network connecting said second computer and a computer at a financial institution, said second computer communicating a credit to said financial institution computer so that an account of a consumer at said financial institution is credited to reconcile selections and purchases made by said consumer.

11. The system of claim 4 wherein said consumer account database includes a name for each customer.

12. The system of claim 1 wherein said first network comprises the Internet.

13. The system of claim 12 wherein said first network further comprises a Web site presenting a consumer account accessible only upon presentation of said unique key by said consumer.

14. The system of claim 13 wherein said Web site is associated with said store.

15. The system of claim 13 wherein said Web site operates on a server, said server interacting with said second computer to access said consumer account.

16. The system of claim 1 wherein said accessed account presents data of previously purchased items by said consumer.

17. The system of claim 16 wherein said data of previously purchased items are formatted to industry standards.

18. The system of claim 1 wherein said second communications network transmits recorded selection data of promotion choices from said second computer to said at least one computer at said associated store within a preselected time limit after said second computer records data of selections of said promotion choices made by said consumer so that said data is transmitted prior to purchase of items by said consumer at said associated store.

19. The system of claim 1 wherein said second communications network transmits recorded selection data of promotion choices from said second computer to said at least one computer at said associated store upon purchase of items by said consumer at said associated store so that discounts credited to said consumer account are indicated at the time of purchase of items by said consumer at said associated store.

20. The system of claim 1 further comprising a fourth network connecting said second computer and a computer at a promoter, said promoter computer communicating to said second computer at least one item for promotion at said associated store.

21. The system of claim 20 wherein said promoter computer further communicating to said second computer at least one criterion for promotion of said at least one item as a promotion choice at said associated store.

22. The system of claim 20 wherein said promoter computer operates with a GUI.

23. A method for distributing and redeeming electronic promotions to a plurality of consumers through a communications network, comprising:

maintaining an account for each consumer, said account including purchasing history information of said consumer;

associating each consumer account with a unique key;

permitting access to said consumer account, including said consumer purchasing history information, by said consumer upon presentation of said unique key over said communications network;

presenting promotion choices of items available at at least one store associated with said unique key over said communications network;

recording selections of said promotion choices made by said consumer over said communications network;

receiving data of purchased items by said consumer at said associated store; and reconciling said promotion choices and purchases to credit said consumer.

24. The method of claim 23 wherein said purchasing history includes data of previously purchased items by said consumer.

25. The method of claim 24 wherein said consumer account comprises a discount account established by a third party.

26. The method of claim 23 wherein said reconciling step comprises recording a credit in said consumer account.

27. The method of claim 26 wherein said consumer account comprises a financial institution account.

28. The method of claim 27 wherein said financial institution account comprises a "deposit-only" account.

29. The method of claim 24 wherein said consumer account comprises a store loyalty program account.

30. The method of claim 23 wherein said reconciling step comprises directly crediting consumer at said associated store.

31. The method of claim 30 wherein said consumer account comprises a store loyalty program account.

32. The method of claim 30 wherein said consumer account comprises a discount account established by a third party.

33. The method of claim 23 wherein said presenting promotion choices step comprises presenting specific discounts on specific items.

34. The method of claim 23 wherein said presenting promotion choices step comprises presenting a purchase incentive for one or more items available in said associated store, said purchase incentive unrelated to said one or more items.

35. The method of claim 23 wherein said presenting promotion choices step comprises presenting specific prices on specific items.

36. The method of claim 23 further comprising the step of sending data of said recorded selections to one or more of said associated stores within a preselected time limit after said recording selection step so that said data is sent prior to purchase of items by said consumer at said associated store.

37. The method of claim 36 further comprising the step of indicating discounts credited to said consumer account at the time of purchase of items by said consumer at said associated store.

38. The method of claim 37 further comprising the step of invalidating said sent data of said recorded selections to one or more of said associated stores within a preselected time limit after said time of purchase of items by said consumer at said associated store.

39. The method of claim 36 further comprising the step of inferring a likely associated store where purchase will occur by said consumer.

40. The method of claim 39 wherein said inferring step comprises inferring said likely associated store from the data of previously purchased items by said consumer.

41. The method of claim 39 wherein said inferring step comprises inferring said likely associated store from said unique key.

42. The method of claim 36 wherein said one or more associated stores are preselected by said consumer.

43. The method of claim 23 further comprising the step of sending data of said recorded selections to said associated store upon purchase of items by said consumer at said associated store so that discounts credited to said consumer account are indicated at the time of purchase of items by said consumer at said associated store.

44. The method of claim 23 wherein said receiving data of purchased items step occurs upon purchase of items by said consumer at said associated store.

45. The method of claim 23 wherein said receiving data of purchased items step occurs within a preselected time limit after purchase of items by said consumer at said associated store.

46. The method of claim 23 wherein said data presenting step further comprises formatting said data to industry standards.

47. The method of claim 23 further comprising the step of offering promotions to said consumer derived from received data of consumer purchases.

48. The method of claim 47 wherein said promotion offering step comprises targeting large aggregates of consumers.

49. The method of claim 47 wherein said promotion offering step comprises targeting individual consumers.

50. The method of claim 49 wherein said targeting step comprises inferring said individual consumers from purchasing and promotion selection data of said consumers.

51. The method of claim 50 wherein promotions offered to a targeted individual consumer include promotions for products and services based upon purchasing and promotion selection data of said consumer, said promotions for products and services unrelated to items actually purchased by said consumer.

52. A system for distributing and redeeming electronic promotions to a plurality of consumers comprising:

a first communications network interconnected to a plurality of first computers interfacing with said plurality of consumers;

at least one second computer connected to said first communications network, said second computer maintaining an account for each consumer and a database of items for promotion to said plurality of said consumers, each consumer account accessible upon presentation of a unique key over said first communications network, said accessed account showing promotion choices of items available at least one store associated with said key, said second computer recording data of selections of said promotion choices made by said consumer over said first communications network;

a second communications network interconnecting said second computer and at least one computer at said associated store so that said second computer and said store computer can exchange recorded selection data of promotion choices and purchase data of items at said associated store over said second communications network to reconcile said selections and purchases to credit said consumer; and a third communications network interconnecting said second computer and at least one computer at a promoter of an item, said third communications network carrying data of said item from said promoter computer for insertion into said database of items for promotion in said second computer.

53. The system of claim 52 wherein said third communications network further carrying data of at least one criterion for promotion of said item from said promoter computer for insertion into said database of items for promotion in said second computer.

54. The system of claim 52 wherein said promoter computer operates with a GUI.

55. A method for distributing and redeeming electronic promotions to a plurality of consumers through a communications network, comprising:

maintaining an account for each consumer;

associating each consumer account with a unique key;

permitting access to said consumer account upon presentation of said unique key over said communications network;

presenting promotion choices of items available at at least one store associated with said unique key over said communications network;

recording selections of said promotion choices made by said consumer over said communications network;

inferring one or more associated stores where purchase is likely to occur by said consumer;

sending data of said recorded selections to said one or more associated stores within a preselected time limit after said recording selection step so that said data is sent prior to purchase of items by said consumer at one of said associated stores;

receiving data of purchased items by said consumer at said one associated store; and     reconciling said selections and purchases to credit said consumer.

56. The method of claim 55 wherein said inferring step comprises inferring said likely associated stores from the data of previously purchased items by said consumer.

57. The method of claim 55 wherein said inferring step comprises inferring said likely associated stores from said unique key.

58. The method of claim 55 further comprising the step of indicating discounts credited to said consumer account at the time of purchase of items by said consumer at said one associated store.

59. The method of claim 58 further comprising the step of invalidating said sent data of said recorded selections to one or more of said associated stores within a preselected time limit after said time of purchase of items by said consumer at said one associated store.

* * * * *